Aug. 21, 1945. W. O. BECHMAN 2,383,364
AIR CLEANER
Filed Oct. 26, 1942 2 Sheets-Sheet 2
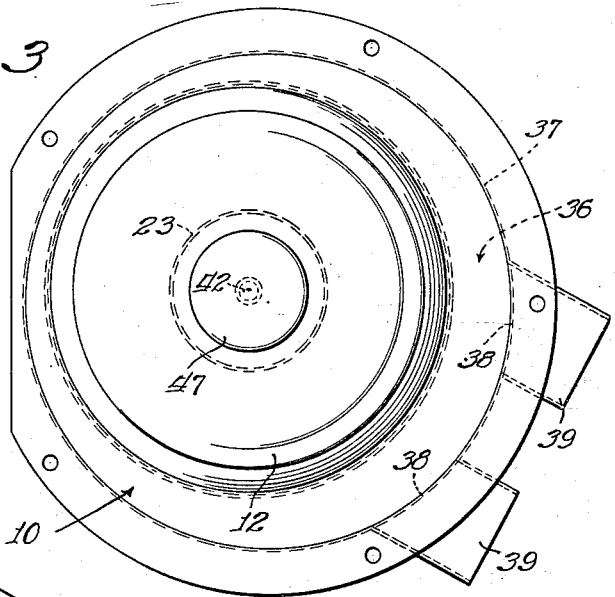
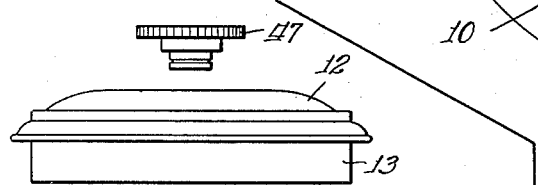
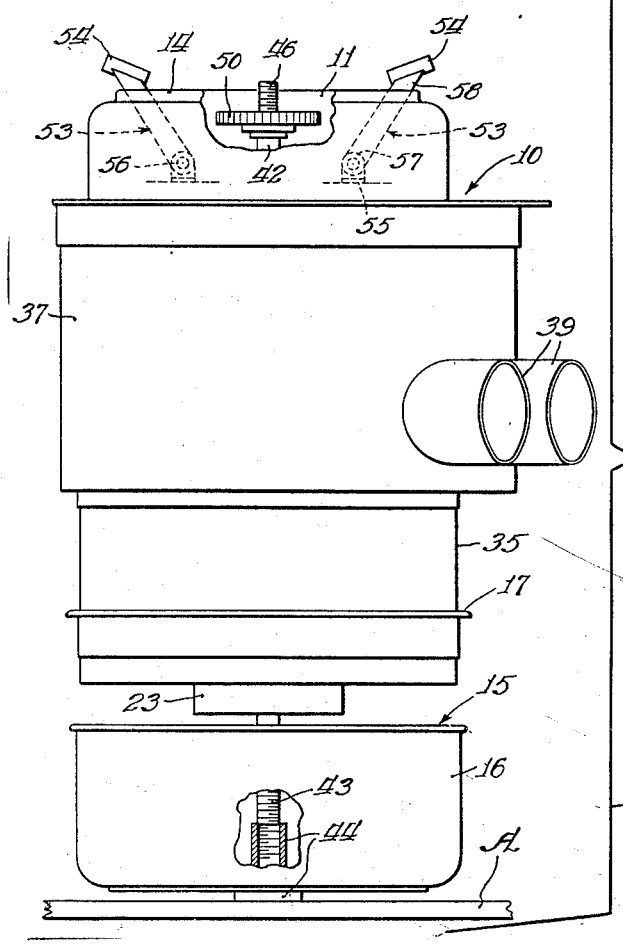
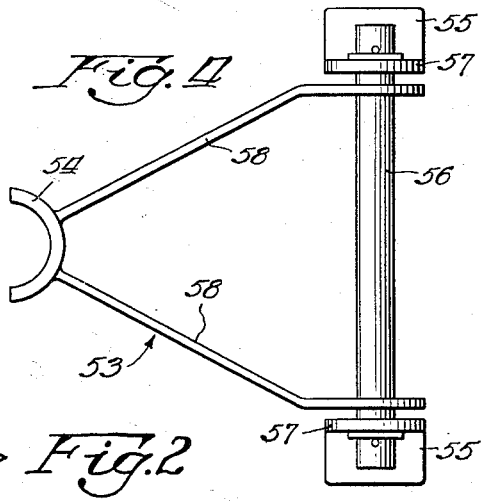
Inventor:
William O. Bechman
By: Paul O. Pippel
Atty.

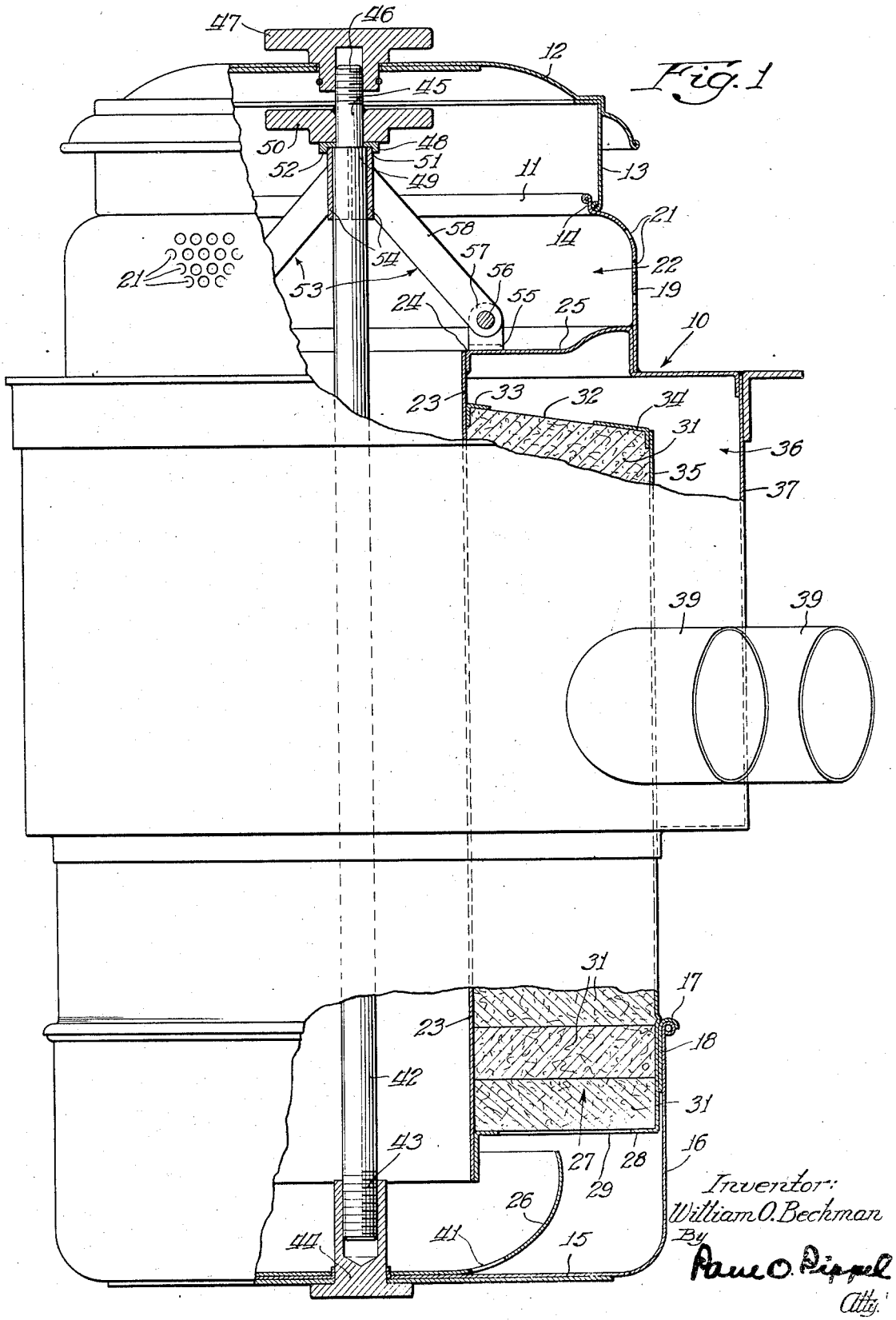

Patented Aug. 21, 1945

2,383,364

UNITED STATES PATENT OFFICE 2,383,364

AIR CLEANER

William O. Bechman, Chicago, Ill., assignor to International Harvester Company, a corporation of New Jersey Application October 26, 1942, Serial No. 463,352

5 Claims. (Cl. 220—55)

This invention has to do with air cleaners of the filter type or the like and relates more particularly to a novel structure for detachably securing parts thereof in assembly.

The general object of this invention is the provision, in an air filter device having a casing with cover members for oppositely disposed casing openings, of an improved simplified structure for securing the cover members against accidental displacement from their openings and of such manipulative character that the cover members are quickly and conveniently assembled or removed from the casing as desired.

Another object is the provision of a releasable retaining means for the casing cover members that accommodates successive removal thereof whereby one may be removed to permit inspection within a desired part of the casing without loosening the second cover member.

A further object is the provision of such a cover member securing structure in which holding parts for the second cover member are manipulative at portions thereof exposed by virtue of the casing opening of the one cover member, when the latter is removed, for releasing the second cover member; and conversely in which structure said manipulative portions for releasing the second cover member are enclosed and guarded by the one cover member when it is in closing relation with its casing opening.

Still a further object of the invention is the provision in a new retaining means for a bottom filter-bath receptacle detachably in covering relation with a lower filter casing opening, of a rod projecting upwardly through the casing where it is accessible for receiving an end thrust instrumental in pressing the receptacle from said casing opening.

These and other desirable objects inherent to and encompassed by the invention will be better understood from the ensuing description together with the annexed drawings, wherein:

Figure 1 is a side elevational view of a filter unit with a form of the invention embodied into its structure, side wall portions of the casing being broken away and other parts of the unit being shown in cross-section for clarity;

Figure 2 is an exploded view of the filter unit illustrating various detachably associated parts in side elevation;

Figure 3 is a top view of the filter unit; and

Figure 4 is a view taken from above showing one of two pivotal elements comprising part of a holding means of the invention.

While the invention may be employed upon the various forms of filter devices or units, it is particularly useful upon air filters for filtering the air of internal combustion engines, and, therefore, the invention is herein illustrated in a preferred form upon such a filter device.

The filter device shown in the drawing comprises a sheet metal casing 10 that is substantially cylindrical. An upper end opening 11 of such casing is shown closed by a cover member 12 having a depending cylindrical flange 13 of which the lower end is adapted to seat exteriorly about an upturned lip portion 14 bounding the opening 11.

It will be observed that the cover member 12 projects outwardly from the plane of the opening 11 to enclose an additional space axially aligned therewith. In a general sense the opening may be regarded as including said space.

The lower end of the casing 10 is closed by a cover member 15 which constitutes a receptacle for an oil bath as is well understood in the art, said receptacle cover member 15 having a cylindrical side wall 16 telescopically associated with the lower end portion of the casing. The distance the receptacle cover member is slidable onto the casing is limited by abutment of the upper end of the cylindrical wall 16 with a flange 17 extending radially outwardly from a band 18 secured to and circumscribing the casing side wall.

The casing includes a perforated side wall portion 19 adjacently to its upper end. Some of these perforations are illustrated at 21, although it will be understood that similar perforations exist throughout the entire expanse of the wall portion 19. Said wall 19 bounds an air intake chamber 22 into which air is drawn through the perforations 21. An air intake tube 23 disposed coaxially with the casing 10 communicates with the chamber 22 through a central opening 24 in a bottom wall 25 of such chamber, and the lower end of the tube 23 communicates with the receptacle cover member 15. Air drawn into the device through the perforations 21 and passing downwardly through the tube 23 is deflected upwardly by a semispherical baffle member 26 into an annular filter passage 27 formed between the side wall of the casing 10 and the tube 23. A bottom 28 for the filter passage 27 has a plurality of large openings 29 through which the air is directed upwardly into said passage. As in the case of the opening 11 considered to include the space thereabove enclosed by the cover member 12, the opening 29 may be considered to include the space therebelow convered or enclosed by the axially projecting cover member 15. Said bottom member 28 supports a stack of annular filter elements 31 which may be of any conventional type. The filtered air escapes from the upper end of the filter passage 27 through an annular space 32 formed between flanged annuli 33 and 34 secured respectively to the tube 23 and to a vertical wall portion 35 of the casing 10. Thus, the air in filtered condition ultimately reaches an annular chamber 36 of which the greater portion is bounded by said vertical wall portion 35 and a casing wall portion 37, and from this chamber the filtered air is discharged from the device through holes 38, Figure 3, in said wall portion 37. Flange-like coupling members 39 are connected with the casing wall in respective coaxial relation with the openings 38 to facilitate the attachment of conduit means (not shown) to the casing communicatably with said openings for directing the filtered air to the desired place for its use as to a carbureter.

The filter device just described is not new. As for its operation, it will suffice to say that air to be filtered is drawn thereinto through the perforations 21 into the chamber 22, thence downwardly through the tube 23, upwardly through the filter units 31 in the annular filter chamber 27, then through the annular space 32 at the upper end of the filter chamber, into the chamber 36 and outwardly of the device through the casing side wall openings 38 and spaces surrounded by the flanges 39. A body of oil (not shown) within the receptacle cover member 15 tends to seek a common level within those portions of the receptacle that are respectively within and without the cuplike baffle member 26 because of holes 41 in said baffle member. The air stream directed downwardly through the tube 23 onto the oil within the baffle member 26 carries part of such oil with it as it is directed upwardly through the filter elements 31 and thereby keeps these filter elements moistened for enabling them to operate efficiently as dirt collectors. Excess oil on the filter elements trickles downwardly therefrom into that portion of the receptacle 15 that is exterior of the baffle member 26 and recirculates into the baffle member through said holes 41.

The invention relates to apparatus now to be described for holding the cover member 12 and the receptacle cover member 15 detachably in association with the casing 10 in the manner shown in Figure 1. A rod 42 arranged coaxially within the tube 23 serves as a tension member for holding the cover members 12 and 15 in place upon their respective ends of the casing. The lower end of said rod is threaded at 43 for coaction with a cap nut 44 which is mounted within a central opening in the bottom of the receptacle cover member 15. This cap nut is secured non-rotatively to said cover member. The upper end of said rod 42 has a reduced diameter portion 45 on which there is a set of screw threads 46 onto which there is turnable a cap nut 47 for holding the cover member 12 in position upon the casing 10. Below the threaded section 46 on said reduced end portion 45 of the rod 42 there is fixed a flange-like knob 50 in non-rotative relation with respect to said rod so that the circular periphery of said knob may be conveniently engaged as by the finger-tips for rotating the rod. An inverted seat member 48 is secured between the lower end of the knob 50 and the shoulder 49 on the rod to effect an annular seat 51 between a circular flange 52 on the member 48 and said rod. This seat 51 cooperates with a rod supporting or holding means 53 which comprises split collar portions 54 adapted to complementally embrace that section of the rod adjacently below the seat member 48 and to dispose their upper ends into the seat 51.

Said semicylindrical split collar members 54 are pivotally supported upon pairs of brackets 55 by means of pivot pins 56 journaled in apertured ears 57 of said brackets and pairs of arms 58 connecting the split sleeve members with their respectively associated pins 56. The brackets 55 are fixed upon the bottom wall 25 of the air intake chamber 22.

During service of a filter unit of the present class, there is a tendency for dirt particles to collect upon the side walls of the air passages leading to or preceding the actual filtering units 31; that is, there is an accumulation of dirt upon the side walls of the intake chamber 22 and of the vertical tube 23. This accumulation of foreign matter is augmented by the fact that some of the oil from the receptacle cover member 15 is splashed onto the tube 23 and because of its low surface tension it creeps upwardly first onto the walls of said tube 23 and of the chamber 22 and then onto the layer of the accumulated foreign matter. The accumulation is particularly rapid when the filter unit is employed in such installations as upon tractors where a cloud of dust is frequently incurred in the atmosphere ambient to the tractor engine. Under these circumstances periodic inspection of the air intake chamber 22 and of the tube 23 is imperative so that the dirt can be removed before accumulating in amounts causing material impairment to the operation of the device.

Such periodic inspections of the device are encouraged when access for inspection is convenient. With the present apparatus the cover member 12 is readily removed simply by manually unscrewing the cap nut 47 from the upper end of the rod 42. Thereafter the cover 12 is removable from the upper end of the casing to provide access through the casing opening 11 for the removal of any foreign matter that may have collected within the chamber 22 and the tube 23. While the cover 12 is removed, the level of the oil in the receptacle cover member 15 may be observed through the tube 23. Should the oil level be correct and no other servicing be required that would necessitate the removal of the receptacle cover member 15, the cover member 12 will simply be replaced onto the casing 10 and clamped into place by the nut 47, following the inspection.

On the other hand, while the cover member 12 is removed, should it be apparently necessary to remove the receptacle cover member, as for the discharge therefrom of accumulated dirt, this is accomplished by gripping the circular periphery of the knob 50 as by the finger-tips for rotating such knob and the rod 42. When there is no obstruction beneath the receptacle cover member 15, such as a part of the engine block, accessories attached thereto or brackets for such accessories, such as indicated at "A" in Figure 2, the procedure is expedited simply by rotating the rod 42 in the threaded cap nut 44 sufficiently to raise the flange 52 on the said member 48 above the upper ends of the split collars 54 whereby the arms 58 carrying said split collar members can be pivoted about the journals of the pins 56 in the apertured bracket ears 57 to the pivoted position illustrated in Figure 2. Thus, clearance is provided for the knob 50 so that said knob and the rod 42 may be displaced downwardly with the receptacle cover member 15 pursuant to sliding the latter from its assembly with the casing 10. Downward force may be applied to the upper end of the rod 42 and/or to the knob 50 for disassembling the receptacle cover member from the casing. When there is an obstruction such as shown at "A" in Figure 2 in close proximity with the lower end of the bottom of the respective cover member 15, the latter will necessarily be removed from the casing separately from the rod 42, so that the procedure in removing said receptacle cover member under these conditions is to rotate the knob 50 and said rod for completely detaching the threaded section 43 of said rod from the cap nut 44 as shown in Figure 2. Following this step, the rod 42 may be lifted upwardly for carrying its lower end portion out of horizontal alinement with the receptacle cover member, wherefore the latter may be withdrawn laterally from the space between the lower end of the casing and the obstruction "A," preparatory to pouring off the oil and dumping the sludge therefrom.

Reassembly of the receptacle cover member 15 with the casing merely involves a reversal of the above described steps relating to the detachment and the removal of said member from the casing.

It will be noted that the parts for detachably locking the receptacle covering member 15 in assembly with the casing are enclosed within the casing when the cover member 12 is in place, thus giving the exterior of the casing an improved appearance. There is the additional advantage in having said retaining parts for the member 15 within the casing that said casing may be mounted upon an engine block without regard to proximity of other accessory apparatus along its side walls since access to this side wall for servicing the device is unnecessary. Furthermore, the parts for supporting the rod 42 and the knob 50 by means of which rotative force is applied to said rod are exposed within convenient access for manipulation by virtue of the casing top opening 11 when the cover member 12 is removed.

While I have shown and described but a single preferred embodiment, it should be understood that many changes may be made in the construction, details and arrangement of the parts without departing from the spirit and scope of the present invention or sacrificing all of the advantages thereof.

What is claimed is:

1. In an air filter structure including a casing wherein there are opposite end openings, and cover members respectively for and removably associated with said openings; means for releasably retaining one of said cover members in such association with its one of said openings by preventing outward movement thereof from such opening, comprising an elongated member having an end portion connected with said one cover member and projecting therefrom axially in said casing, and holding means within the casing adjacently to the other cover member and releasably connectible between a portion of the casing and said elongated member to hold the latter against axial movement toward said one opening of the one cover member as an expedient for precluding removal of such member from such opening, and said holding means being manipulatable to release the elongated member therefrom and also being disposed within convenient access for such manipulation by virtue of the other of said openings when its cover member is removed.

2. In an air filter structure including a casing wherein there are opposite end openings, and cover members respectively for and removably associated with said openings; means for releasably retaining one of said cover members in such association with its one of said openings by preventing outward movement thereof from such opening, comprising an elongated member having an end portion detachably connected with said one cover member and projecting therefrom axially in said casing, said connection of the elongated member with the one cover member being of a character that detachment thereof is accomplishable by manipulation of an opposite end portion thereof and said opposite end portion being disposed within convenient access for such manipulation by virtue of the other of said openings when the cover member of such opening is removed, and holding means in said casing between said cover members and releasably connected between a portion of the casing and said elongated member for holding the latter against axial movement toward the one opening of the one cover member as an expedient for precluding accidental removal of such cover member.

3. In an air filter structure including a casing wherein there are closable opposite end spaces, and cover members respectively for closing said spaces though removable respectively outwardly therefrom to provide access therethrough into the casing; means for releasably retaining one of said cover members in such association with its one of said spaces, comprising an elongated member having an end portion detachably connected with said one cover member and projecting therefrom axially in said casing, said connection of the elongated member with the one cover member being of a character that detachment thereof is accomplishable by manipulation of an opposite end portion thereof, and holding means in said casing between said cover members and pivotally connected with the casing for manipulation into and from a detachable connection with said elongated member to hold the same against axial movement toward said one space of the one cover member as an expedient for precluding accidental removal of said one cover member from its said one of such spaces, and said holding means and said opposite end portion of the elongated member being disposed for convenient access, for their respective of said manipulations, through the space uncovered when said other of said cover members is removed.

4. In an air filter structure including a casing wherein there are top and bottom end openings, and a cover member and a receptacle member respectively for and in removable closing association with said openings; means for releasably retaining said members in such association with said openings, comprising a rod having a lower end portion in threaded relation with said receptacle member and projecting upwardly in the casing where an upper end portion of such rod is disposed adjacently to the upper end opening of the casing, holding means supported by and in said casing while reacting upon said upper end portion of the rod to prevent downward displacement thereof and accidental removal of the receptacle member from the bottom opening while facilitating rotation of said rod to release its connection with said receptacle member, and means accessible for manipulation exteriorly of said cover member and cooperable with the upper end portion of the rod for releasably retaining the cover member in its association with the top opening, and said upper end portion of the rod being accessible at the top opening for the application of rotating force to said rod for rotating the same as aforesaid when the cover member is removed.

5. In an air filter structure including a casing wherein there are top and bottom end openings, and a cover member and a receptacle member respectively for and in removable closing association with said openings; means for releasably retaining said members in such association with said openings, comprising a rod having a lower end portion in threaded relation with said receptacle member and projecting upwardly in the casing where an upper end portion of such rod is disposed adjacently to the upper end opening of the casing, force-receiving means non-rotatively upon and of greater diameter than said upper end portion of the rod for manipulation in imparting to said rod a rotational force for unscrewing it from said receptacle member to release the same, rod-holding means comprising split collar members embracing the rod below said force-receiving means to prevent downward displacement of the rod and accidental removal of the receptacle member from the bottom opening though being loosely associated with said rod to facilitate its rotation in effecting the aforesaid unscrewing from the receptacle member, said holding means also comprising mounts supported on and in said casing for said split collar members and being manipulatable in effecting separation of said collar members to provide clearance facilitating downward displacement of the rod and of the force-receiving means therepast pursuant to removal of the receptacle member, and said force-receiving means and said rod-holding means being disposed adjacently to the top opening by means of which they are accessible for their said manipulations.

WILLIAM O. BECHMAN.